(12) United States Patent
Jin (10) Patent No.: US 8,698,404 B2
(45) Date of Patent: Apr. 15, 2014

(54) BRIGHTNESS CONTROL FOR LED LIGHTING

(75) Inventor: Xiaoping Jin, Orange, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 177 days.

(21) Appl. No.: 13/423,395

(22) Filed: Mar. 19, 2012

(65) Prior Publication Data

US 2012/0242230 A1    Sep. 27, 2012

Related U.S. Application Data (60) Provisional application No. 61/466,969, filed on Mar. 24, 2011.

(51) Int. Cl.
  *H05B 37/02* (2006.01)
(52) U.S. Cl.
  USPC .......................... 315/121; 315/192; 315/193
(58) Field of Classification Search
  USPC ...... 315/121, 123, 185 R, 192, 193, 297, 307
  See application file for complete search history.

(56) References Cited

U.S. PATENT DOCUMENTS

| | | | |
|---|---|---|---|
| 6,400,101 | B1 | 6/2002 | Biebl et al. |
| 2007/0195025 | A1 | 8/2007 | Korcharz et al. |
| 2008/0258641 | A1 | 10/2008 | Nakagawa et al. |
| 2009/0195169 | A1 | 8/2009 | Huang et al. |
| 2010/0176734 | A1* | 7/2010 | Haubmann ............... 315/185 R |
| 2010/0295471 | A1 | 11/2010 | Ishikura et al. |
| 2011/0068700 | A1 | 3/2011 | Fan |

FOREIGN PATENT DOCUMENTS

| | | |
|---|---|---|
| EP | 1871144 A1 | 12/2007 |
| WO | 2007/148298 A1 | 12/2007 |

OTHER PUBLICATIONS

International Search Report for PCT/US2012/029610 by European Patent Office mailed Jun. 20, 2012.
Written Opinion of the International Searching Authority for PCT/US2012/029610 by European Patent Office mailed Jun. 20, 2012.

* cited by examiner

*Primary Examiner* — Daniel D Chang
(74) *Attorney, Agent, or Firm* — Simon Kahn (57) ABSTRACT

A driving arrangement for light emitting diode (LED) based illumination constituted of: a comparison circuitry arranged to compare an integral of a target current over a target illumination time for at least one LED based luminaire with an integral of an illumination current over an illumination time for the at least one LED based luminaire, the comparison circuitry arranged to output a comparison signal; and a control circuitry in communication with the comparison circuitry and arranged to alternately: allow the flow of electrical current through the at least one LED based luminaire responsive to a first condition of the comparison signal; and prevent the flow of electrical current through the at least one LED based luminaire responsive to a second condition of the comparison signal, the second condition different from the first condition.

16 Claims, 8 Drawing Sheets

BRIGHTNESS CONTROL FOR LED LIGHTING

CROSS-REFERENCE TO RELATED APPLICATIONS

This application claims priority from U.S. Provisional Patent Application Ser. No. 61/466,969 filed Mar. 24, 2011, entitled "Brightness Control for LED Lighting", the entire contents of which is incorporated herein by reference.

FIELD OF THE INVENTION

The present invention relates to the field of solid state lighting, and in particular to an arrangement wherein the on-time of a LED string is controlled responsive to a comparison of an effective brightness signal, representing both the desired on time and a brightness level, with a signal representing both the actual current through the LED string and the actual amount of time for which the current is flowing through the LED string.

BACKGROUND OF THE INVENTION

Light emitting diodes (LEDs) and in particular high intensity and medium intensity LED strings are rapidly coming into wide use for lighting applications. LEDs with an overall high luminance are useful in a number of applications including backlighting for liquid crystal display (LCD) based monitors and televisions, collectively hereinafter referred to as a matrix display, as well as for general lighting applications.

In a large LCD matrix display, and in large solid state lighting applications, such as street lighting and signage, typically the LEDs are supplied in a plurality of strings of serially connected LEDs, at least in part so that in the event of failure of one string at least some light is still output. The constituent LEDs of each LED string share a common current.

LEDs providing high luminance exhibit a range of forward voltage drops, denoted $V_f$, and their luminance is primarily a function of current. For example, one manufacturer of LEDs suitable for use with a backlight application for a portable computer, such as a notebook computer, indicates that $V_f$ for a particular high luminance white LED ranges from 2.95 volts to 3.65 volts at 20 mA and a LED junction temperature of 25° C., thus exhibiting a variance in $V_f$ of greater than ±10%. Furthermore, the luminance of the LEDs vary as a function of junction temperature and age, typically exhibiting a reduced luminance as a function of current with increasing temperature and increasing age. In order to provide backlight illumination for a portable computer with an LCD matrix display of at least 25 cm measured diagonally, at least 20, and typically in excess of 40, LEDs are required. In order to provide street lighting, in certain applications over 100 LEDs are required.

In order to provide a balanced overall luminance, it is important to control the current of the various LED strings to be approximately equal. In one embodiment a power source is supplied for each LED string, and the voltage of the power source is controlled in a closed loop to ensure that the voltage output of the power source is consonant with the voltage drop of the LED string, however the requirement for a power source for each LED string is quite costly.

In another embodiment, as described in U.S. Patent Application Publication US 2007/0195025 to Korcharz et al, entitled "Voltage Controlled Backlight Driver" and published Aug. 23, 2007, the entire contents of which is incorporated herein by reference, this is accomplished by a controlled dissipative element placed in series with each of the LED strings. In another embodiment, binning is required, in which LEDs are sorted, or binned, based on their electrical and optical characteristics. Thus, in accordance with the prior art, in order to operate a plurality of LED strings from a single power source, at a common current, either binning of the LEDs to be within a predetermined range of $V_f$ is required, or a balancing element, such as the dissipative element of the aforementioned patent application, must be supplied to drop the voltage difference between the strings caused by the differing $V_f$ values so as to produce an equal current through each of the LED strings. Either of these solutions adds to cost and/or wasted energy.

Dimming of an LED string is often performed responsive to a pulse width modulated, or otherwise modulated, dimming signal. To save energy, the power source supplying power to the various LED strings may be shut down when the incoming dimming signal is in an off, or inactive condition. Unfortunately, for low duty cycles, the amount of time required to start up the power source may be longer than the length of the active portion of the actual dimming signal, thus requiring a complex control circuitry, again adding to cost.

SUMMARY OF THE INVENTION

Accordingly, it is a principal object of the present invention to overcome at least some of the disadvantages of the prior art. This is provided in certain embodiments by an arrangement wherein the on-time of a LED string is controlled responsive to a comparison of an effective brightness signal, representing both the desired on time and a brightness level, with a signal representing the actual current through the LED string and the actual amount of time for which the current is flowing through the LED string.

In one exemplary embodiment, a driving arrangement for LED based illumination is provided, the driving arrangement comprising: a comparison circuitry arranged to compare an integral of a target current over a target illumination time for at least one LED based luminaire with an integral of an illumination current over an illumination time for the at least one LED based luminaire, the comparison circuitry arranged to output a comparison signal; and a control circuitry in communication with the comparison circuitry and arranged to alternately: allow the flow of electrical current through the at least one LED based luminaire responsive to a first condition of the comparison signal; and prevent the flow of electrical current through the at least one LED based luminaire responsive to a second condition of the comparison signal, the second condition different from the first condition.

In one further embodiment, the driving arrangement further comprises a balancing network, wherein the at least one LED based luminaire comprises a plurality of LED based luminaries connected to receive power in parallel from a common power source via the balancing network. In one yet further embodiment the common power source is responsive to an output of the control circuitry, wherein the allowance of the flow of electrical current through the at least one LED based luminaire responsive to the first condition of the comparison signal comprises activation of the common power source responsive to the first condition of the comparison signal, and the prevention of the flow of electrical current through the at least one LED based luminaire responsive to the second condition of the comparison signal comprises deactivation of the common power source responsive to the second condition of the comparison signal.

In one further embodiment the at least one LED based luminaire comprises a plurality of LED based luminaries connected to receive power in parallel from a common power source, the common power source responsive to an output of the control circuitry, wherein the allowance of the flow of electrical current through the at least one LED based luminaire responsive to the first condition of the comparison signal comprises activation of the common power source responsive to the first condition of the comparison signal, and the prevention of the flow of electrical current through the at least one LED based luminaire responsive to the second condition of the comparison signal comprises deactivation of the common power source responsive to the second condition of the comparison signal.

In one further embodiment the driving arrangement comprises a particular electronically controlled switch in series with each of the at least one LED based luminaries, each of the particular electronically controlled switches responsive to an output of the control circuitry, wherein the allowance of the flow of electrical current through the at least one LED based luminaire responsive to the first condition of the comparison signal comprises closure of the particular electronically controlled switch in series with the LED based luminaire responsive to the first condition of the output of the control circuitry, and the prevention of the flow of electrical current through the at least one LED based luminaire responsive to the second condition of the comparison signal comprises an open condition of the particular electronically controlled switch in series with the LED based luminaire responsive to the second condition of the comparison signal. In one yet further embodiment the control circuitry comprises a drive signal generator with a periodic output, wherein the allowance of the flow of electrical current through the at least one LED based luminaire is responsive to the first condition of the comparison signal and to the periodic output.

In one further embodiment the comparison circuitry comprises: a first current source arranged to provide a current representative of the target current; a first capacitor arranged to be charged by the first current source; a second current source arranged to provide a current representative of the illumination current; a second capacitor arranged to be charged by the second current source; and a comparator arranged to compare the voltage drop across the first capacitor with the voltage drop across the second capacitor, the comparison signal a function of the output of the comparator. In another embodiment the comparison circuitry comprises: a first current source arranged to provide a current representative of the target current; a second source arranged to provide a current representative of the illumination current; a capacitor arranged to be charged by a first one of the first current source and the second current source and to be discharged by a second one of the first current source and the second current source; and a comparator arranged to compare the voltage drop across the capacitor with a reference voltage, the comparison signal a function of the output of the comparator. In one further embodiment the comparison circuitry is associated with a particular LED based luminaire.

In one embodiment a method of illumination is enabled, the method comprising: comparing an integral of a target current over a target illumination time for at least one luminaire with an integral of an illumination current over an illumination time for the at least one luminaire; alternately, allowing the flow of electrical current through the at least one luminaire responsive to a first condition of the comparison; and preventing the flow of electrical current through the at least one luminaire responsive to a second condition of the comparison, the second condition different from the first condition.

In one further embodiment the at least one luminaire comprises a plurality of luminaries, the method further comprising: balancing the current flow through each of the at least one luminaries. In another further embodiment the allowing the flow of electrical current through the at least one luminaire responsive to the first condition of the comparison comprises activating a common power source, and the preventing of the flow of electrical current through the at least one luminaire responsive to the second condition of the comparison comprises deactivating the common power source. In another further embodiment the allowing of the flow of electrical current through the at least one luminaire comprises closing an electronically controlled switch arranged in series with the luminaire, and the preventing the flow of electrical current through the at least one luminaire comprises opening the particular electronically controlled switch in series with the at least one luminaire.

In one further embodiment the method comprises providing a drive signal generator with a periodic output, wherein the allowing the flow of electrical current through the at least one luminaire is responsive to the first condition of the comparison and to the periodic output. In another further embodiment the method comprises providing a comparison circuitry arranged to perform the comparing, the comparison circuitry arranged to output a comparison signal, the comparison circuitry comprising: a first current source arranged to provide a current representative of the target current; a first capacitor arranged to be charged by the first current source; a second current source arranged to provide a current representative of the illumination current; a second capacitor arranged to be charged by the second current source; and a comparator arranged to compare the voltage drop across the first capacitor with the voltage drop across the second capacitor, the comparison signal a function of the output of the comparator. In yet another further embodiment the method comprises: providing a comparison circuitry arranged to perform the comparing, the comparison circuitry arranged to output a comparison signal, the comparison circuitry comprising: a first current source arranged to provide a current representative of the target current; a second current source arranged to provide a current representative of the illumination current; a capacitor arranged to be charged by a first one of the first current source and the second current source and to be discharged by a second one of the first current source and the second current source; and a comparator arranged to compare the voltage drop across the capacitor with a reference voltage, the comparison signal a function of the output of the comparator.

In one embodiment a driving arrangement for illumination is enabled, the driving arrangement comprising: a means for comparing arranged to compare an integral of a target current over a target illumination time for at least luminaire with an integral of an illumination current over an illumination time for the at least one luminaire, the means for comparing arranged to output a comparison signal; a means for allowing the flow of electrical current through the at least one luminaire responsive to a first condition of the comparison signal; and a means for preventing the flow of electrical current through the at least one luminaire responsive to a second condition of the comparison signal, the second condition different from the first condition.

In one further embodiment, the driving arrangement further comprises a means for balancing, wherein the at least one luminaire comprises a plurality of luminaries arranged to receive power in parallel from a common means for supplying power via the means for balancing. In one yet further embodiment the means for allowing and preventing comprises a control input to the common means for supplying power, wherein the allowance of the flow of electrical current through the at least one luminaire responsive to the first condition of the comparison signal comprises activation of the common means for supplying power responsive to the first condition of the comparison signal, and the prevention of the flow of electrical current through the at least luminaire responsive to the second condition of the comparison signal comprises deactivation of the common means for supplying power responsive to the second condition of the comparison signal.

In one further embodiment the at least one luminaire comprises a plurality of luminaires arranged to receive power in parallel from a common means for supplying power, wherein the means for allowing and preventing comprises a control input to the common means for supplying power, wherein the allowance of the flow of electrical current through the at least one luminaire responsive to the first condition of the comparison signal comprises activation of the common means for supplying power responsive to the first condition of the comparison signal, and the prevention of the flow of electrical current through the at least luminaire responsive to the second condition of the comparison signal comprises deactivation of the common means for supplying power responsive to the second condition of the comparison signal.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1A:
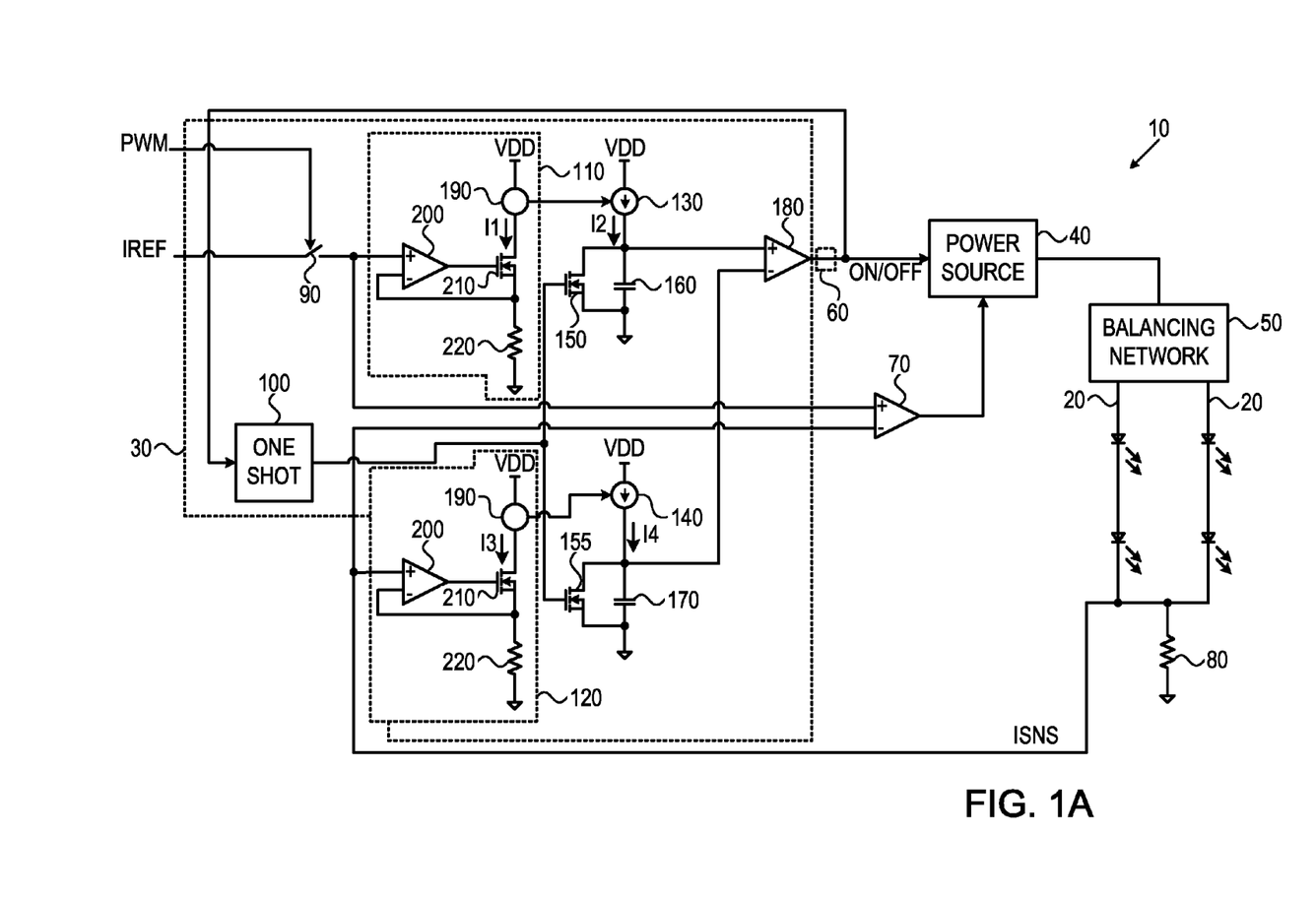
FIG. 1A illustrates a high level schematic diagram of an embodiment of a driving arrangement for a plurality of parallel connected LED strings comprising a comparison circuitry constituted of a plurality of integrating capacitors, wherein the power source is switched alternately on and off responsive to an output signal from the comparison circuitry.

FIG. 1A illustrates a high level schematic diagram of an embodiment of a driving arrangement 10 for a plurality of parallel connected LED strings 20, driving arrangement 10 comprising: a comparison circuitry 30; a power source 40; a balancing network 50; a control circuitry 60; a differential amplifier 70; and a sense resistor 80. Comparison circuitry 30 comprises: an electronically controlled switch 90; a one shot circuitry 100; a target current circuitry 110; an illumination current circuitry 120; a first charging current source 130; a second charging current source 140; an electronically controlled switch 150; an electronically controlled switch 155; a first capacitor 160; a second capacitor 170; and a comparator differential amplifier 180. Each of target current circuitry 110 and illumination current circuitry 120 comprises: a current mirror reference arm 190; a differential amplifier 200; an electronically controlled switch 210; and a sense resistor 220.

In one non-limiting embodiment, each of differential amplifier 70 and differential amplifiers 200 comprises an operational amplifier. In one non-limiting embodiment, each of electronically controlled switches 150, 155 and 210 comprises an n-channel metal-oxide-semiconductor field-effect transistor (NMOSFET). Differential amplifier 70 and differential amplifier 180 are each preferably implemented as comparators.

A first end of electronically controlled switch 90 is connected to a reference voltage, denoted IREF, and a control input of electronically controlled switch 90 is connected to a pulse width modulated signal, denoted PWM. A second end of electronically controlled switch 90 is connected to the non-inverting input of differential amplifier 200 of target current circuitry 110 and to the non-inverting input of differential amplifier 70. The inverting input of each differential amplifier 200 is connected to the source of the respective electronically controlled switch 210 and to a first end of the respective sense resistor 220, and a second end of each sense resistor 220 is connected to a common point. The output of each differential amplifier 200 is connected to the gate of the respective electronically controlled switch 210 and the drain of each electronically controlled switch 210 is connected to an output of the respective current mirror reference arm 190. An input of each current mirror reference arm 190 is connected to a supply voltage, denoted VDD.

A first input of each of first charging current source 130 and second charging current source 140 is connected to supply voltage VDD and a control input of each of first charging current source 130 and second charging current source 140 is connected to a respective current mirror reference arm 190 so as to form a respective current mirror, such that the current output by each of first charging current source 130 and second charging current source 140 is substantially equal to the current flow through the respective current mirror reference arm 190.

An output of first charging current source 130 is connected to the drain of electronically controlled switch 150, to a first end of first capacitor 160 and to the non-inverting input of comparator 180. The source of electronically controlled switch 150 is connected to a second end of first capacitor 160 and to the common point. An output of second charging current source 130 is connected to the drain of electronically controlled switch 155, to a first end of second capacitor 170 and to the inverting input of comparator 180. The source of electronically controlled switch 155 is connected to a second end of second capacitor 170 and to the common point. The gates of electronically controlled switches 150, 155 are commonly connected to an output of one shot circuitry 100. The output of comparator 180 constitutes control circuitry 60 and is connected to a control input of power source 40 and an input of one shot circuitry 100, and is denoted signal ON/OFF. An output of power source 40 is connected to an input of balancing network 50 and each of a plurality of outputs of balancing network 50 is connected to the anode end of a particular LED string 20. The cathode ends of plurality of LED strings 20 are commonly connected to a first end of sense resistor 80, to the non-inverting input of differential amplifier 200 of illumination current circuitry 120 and to the inverting input of differential amplifier 70. The output of differential amplifier 70 is connected to a second input of power source 40 and a second end of sense resistor 80 is connected to the common point.

Figure 1B:
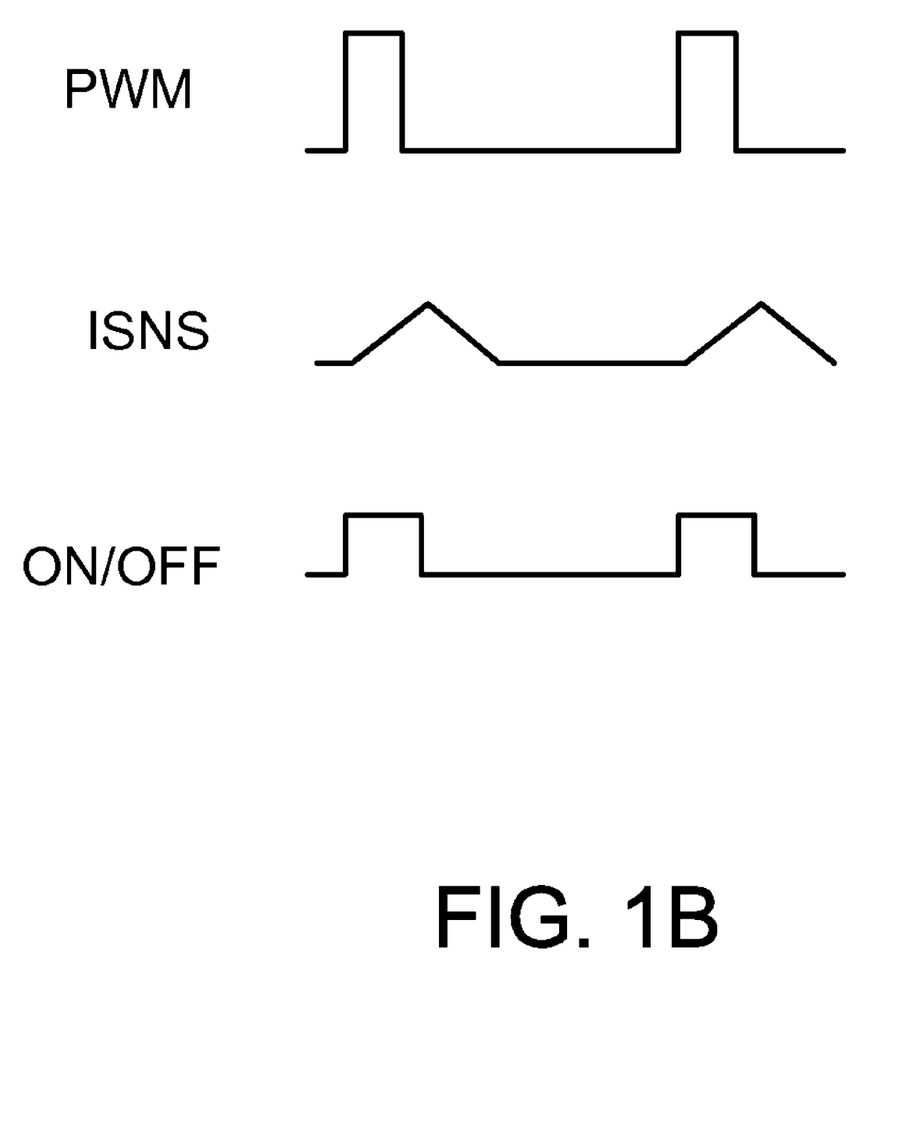
FIG. 1B illustrates a graph of a PWM control signal, the LED current and a power source control signal of the driving arrangement of FIG. 1A, wherein the x-axis represents time and the y-axis represents amplitude in arbitrary units.

FIG. 1B illustrates a graph of certain signals of driving arrangement 10, particularly: signal PWM; the current flowing through the plurality of LEDs 20, as represented by the voltage drop across sense resistor 80, denoted ISNS; and signal ON/OFF, wherein the x-axis represents time and the y-axis represents amplitude in arbitrary units. For the sake of clarity the operation of driving arrangement 10 of FIG. 1A will be described in relation to the graph of FIG. 1B. For ease of understanding, signal PWM is described wherein the active state thereof is the high state and the inactive state is the low state, however this is not meant to be limiting in any way.

In operation, signal PWM exhibits a duty cycle reflective of a target luminance. At a high state of signal PWM electronically controlled switch 90 is closed, thereby connecting reference voltage IREF to the non-inverting inputs of differential amplifier 200 of target current circuitry 110 and to differential amplifier 70. Differential amplifier 200 of target current circuitry 110, in cooperation with the respective electronically controlled switch 210, is arranged as a current source passing a current, denoted I1, of a value such that the voltage drop developed across respective sense resistor 80 by current I1 is equal to the voltage at the non-inverting input of differential amplifier 200 of target current circuitry 110. Thus, when electronically controlled switch 90 is closed, current I1 flowing through current mirror reference arm 190 of target current circuitry 110 is set to be proportional to value IREF. The current output from first charging current source 130 mirrors the current flow through the respective current mirror reference arm 190 and is denoted current I2. Current I2 begins to charge first capacitor 160 and the voltage across first capacitor 160 is received at the non-inverting input of comparator 180. As will be described further below, the potential at the inverting input of comparator 180 is near the common potential, and thus comparator 180 sets output signal ON/OFF of control circuitry 60 to a positive value so as to activate power source 40. Thus signal ON/OFF is set to a positive value responsive to a positive value of signal PWM, and substantially contemporaneously therewith. After a start up time of power source 40, current begins to flow through plurality of LED strings 20 connected to the output of power source 40 via balancing network 50, and increases over time as illustrated by signal ISNS. Balancing network 50 is arranged to maintain a substantially equal current in each of plurality of LED strings 20. In one embodiment, balancing network 50 is not provided and plurality of LEDs 20 are directly connected to the output of power source 40, without exceeding the scope. In another embodiment, balancing network 50 is constituted of a plurality of balancing transformers, each of the balancing transformers exhibits a primary winding in series with a respective LED string 20, and the secondary windings are connected in a closed serial loop. In yet another embodiment, balancing network 50 is constituted of a plurality of impedances significantly greater than the differences in impedance between the various LED strings 20.

ISNS is received at the non-inverting input of differential amplifier 200 of illumination current circuitry 120. Differential amplifier 200 of illumination current circuitry 120, in cooperation with the respective electronically controlled switch 210, is arranged as a current source passing a current, denoted I3, of a value such that the voltage drop developed across respective sense resistor 80 by current I3 is equal to the value of signal ISNS. The current output from second charging current source 140 mirrors the current flow through the respective current mirror reference arm 190 and is denoted current I4. Current I4 begins to charge second capacitor 170 and the voltage across second capacitor 170 is received at the inverting input of comparator 180.

When signal PWM changes to a low state, electronically controlled switch 90 is opened, thereby ceasing the flow of currents I1 and I2. The voltage drop across first capacitor 160 is thus reflective of an integral of a target current, as represented by signal IREF, over a target illumination time, as represented by the duty cycle of signal PWM. Power source 40 is active responsive to the output of control circuitry, and ISNS rises over time until reaching the target current, i.e. voltage representation ISNS becomes equal to reference voltage IREF, and is maintained equal by the closed loop operation of power source 40 and differential amplifier 70. As a result of the gradual approach of ISNS towards the target current IREF, and consequently the gradual approach of current I14 towards current I12, second capacitor 170 is initially charged at a slower pace than first capacitor 160. Thus, when electronically controlled switch 90 is opened responsive to signal PWM no longer being asserted, the voltage across second capacitor 170 is smaller than the voltage across first capacitor 160 and control circuitry 60 maintains power source 40 in an activate state.

Second capacitor 170 continues to charge until the voltage across second capacitor 170 becomes equal to the voltage across first capacitor 160. When the voltage across second capacitor 170 exceeds the voltage across first capacitor 160, comparator 180 de-asserts signal ON/OFF, and thus control circuitry 60 deactivates power source 40. The voltage across second capacitor 170 is reflective of an integral of the illumination current over the illumination time and since the voltage across second capacitor 170 is equal to the voltage across first capacitor 160 at the time of de-assertion of signal ON/OFF, the integral of the actual illumination current ISNS over the actual illumination time is equal to the integral of the target current represented by IREF over the target illumination time represented by the active portion of signal PWM. Thus, plurality of LEDs 20 achieve the target overall luminance output reflected by the duty cycle of signal PWM.

Simultaneously with the deactivation of power source 40 by the de-assertion of signal ON/OFF, control circuitry 60 is arranged to control one shot circuitry 100 to close electronically controlled switches 150 and 155 for a predetermined time period, thereby discharging first capacitor 160 and second capacitor 170. As power source 40 is deactivated, the current through LED strings 20, as represented by signal ISNS begins to decrease over time and second capacitor 170 again charges, after the predetermined time period of one shot circuitry 100, until signal ISNS reaches zero. The voltage across second capacitor 170 represents a luminance surplus, i.e. effective luminance greater than the total target luminance, which will be compensated for during the next cycle of signal PWM, as it will take less time for the voltage across second capacitor 170 to reach the value of the voltage across first capacitor 160.

Control circuitry is described herein as a direct pass through connection between the output of comparator 180 and the control input of power source 40, and thus may be implemented by a direct connection, however this is not meant to be limiting in any way.

Figure 2A:
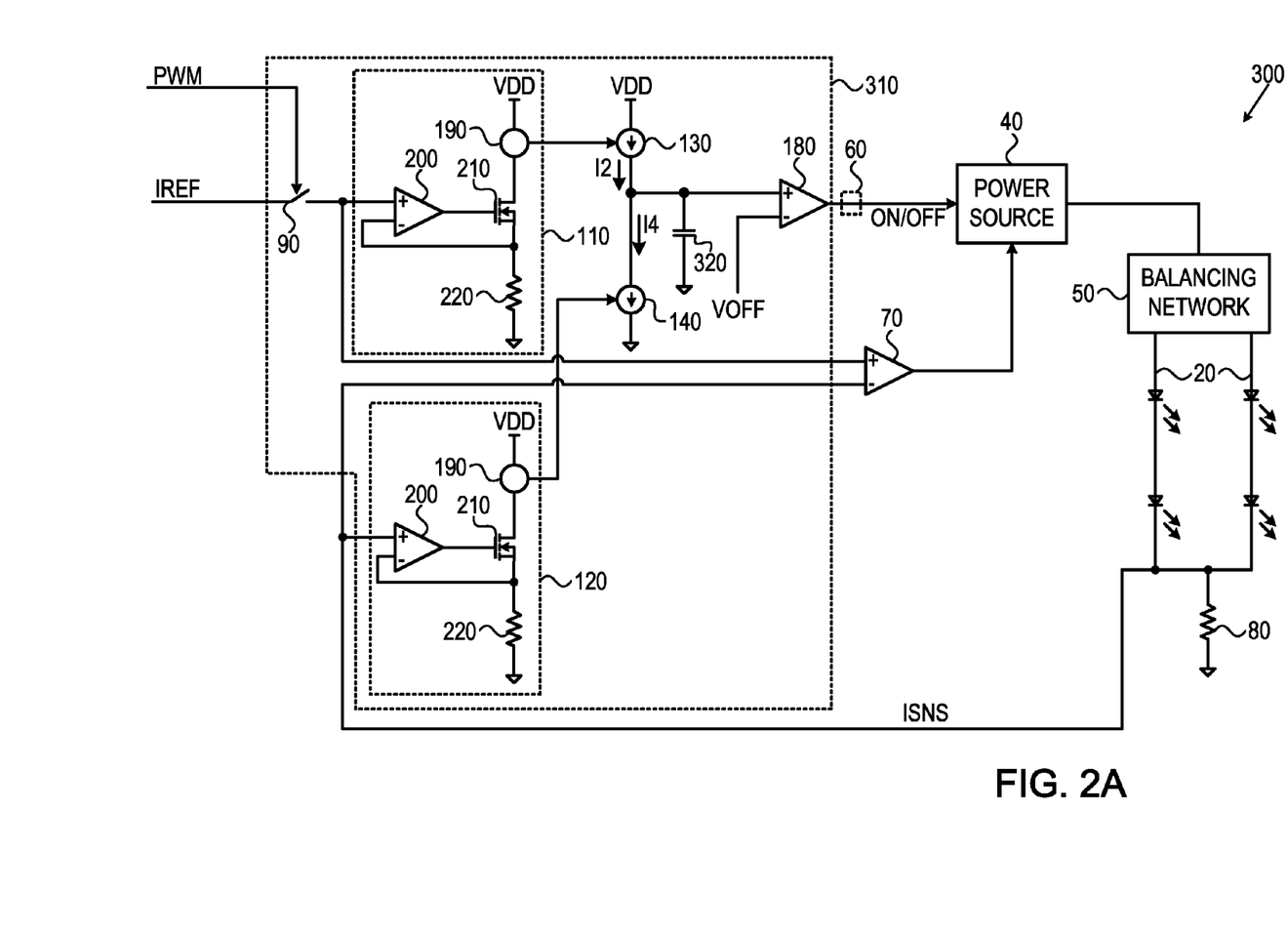
FIG. 2A illustrates a high level schematic diagram of an embodiment of a driving arrangement for a plurality of parallel connected LED strings comprising a comparison circuitry constituted of a unitary integrating capacitor, wherein the power source is switched alternately on and off responsive to an output signal from the comparison circuitry.

FIG. 2A illustrates a high level schematic diagram of an embodiment of a driving arrangement 300 for a plurality of parallel connected LED strings 20, comprising: a comparison circuitry 310; a power source 40; a balancing network 50; a control circuitry 60; a differential amplifier 70; and a sense resistor 80. Comparison circuitry 310 comprises: an electronically controlled switch 90; a target current circuitry 110; an illumination current circuitry 120; a first charging current source 130; a second charging current source 140; a capacitor 320; and a comparator 180. Each of target current circuitry 110 and illumination current circuitry 120 comprises: a current mirror reference arm 190; a differential amplifier 200; an electronically controlled switch 210; and a sense resistor 220.

A first end of electronically controlled switch 90 is connected to a reference voltage, denoted IREF, and a control input of electronically controlled switch 90 is connected to a pulse width modulated signal, denoted PWM. A second end of electronically controlled switch 90 is connected to the non-inverting input of differential amplifier 200 of target current circuitry 110 and to the non-inverting input of differential amplifier 70. The inverting input of each differential amplifier 200 is connected to the source of the respective electronically controlled switch 210 and to a first end of the respective sense resistor 220 and a second end of each sense resistor 220 is connected to a common point. The output of each differential amplifier 200 is connected to the gate of the respective electronically controlled switch 210 and the drain of each electronically controlled switch 210 is connected to an output of the respective current mirror reference arm 190. An input of each current mirror reference arm 190 is connected to a supply voltage, denoted VDD.

A first input of first charging current source 130 is connected to supply voltage VDD. An output of first charging current source 130 is connected to a first input of second charging current source 140, to a first end of capacitor 320 and to the non-inverting input of comparator 180. An output of second charging current source 140 and a second end of capacitor 320 is connected to the common point. A control input of each of first charging current source 130 and second charging current source 140 is connected to a respective current mirror reference arm 190 to form a current mirror, such that the current output by each of first charging current source 130 and second charging current source 140 is substantially equal to the current flow of the respective current mirror reference arm 190. The inverting input of comparator 180 is connected to an offset voltage, denoted voltage VOFF.

The output of comparator 180 constitutes control circuitry 60 and is connected to a first input of power source 40, and denoted signal ON/OFF. An output of power source 40 is connected to an input of balancing network 50 and each of a plurality of outputs of balancing network 50 is connected to the anode end of a particular LED string 20. The cathode ends of plurality of LED strings 20 are commonly connected to a first end of sense resistor 80, to the non-inverting input of differential amplifier 200 of illumination current circuitry 120 and to the inverting input of differential amplifier 70. The output of differential amplifier 70 is connected to a second input of power source 40 and a second end of sense resistor 80 is connected to the common point. In one embodiment balancing network 50 is not provided and plurality of LED strings 20 is directly connected to power source 40, without exceeding the scope. In another embodiment, balancing network 50 is constituted of a plurality of balancing transformers, each of the balancing transformers exhibits a primary winding in series with a respective LED string 20, and the secondary windings are connected in a closed serial loop. In yet another embodiment, balancing network 50 is constituted of a plurality of impedances significantly greater than the differences in impedance between the various LED strings 20.

Figure 2B:
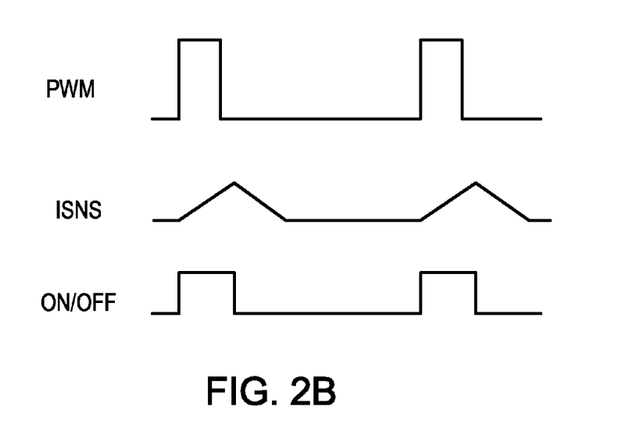
FIG. 2B illustrates a graph of a PWM control signal, the LED current and a power source control signal of the driving arrangement of FIG. 2A, wherein the x-axis represents time and the y-axis represents amplitude in arbitrary units.

FIG. 2B illustrates a graph of certain signals of driving arrangement 300, particularly: signal PWM; the current flowing through the plurality of LEDs 20, as represented by the voltage drop across sense resistor 80, denoted ISNS; and signal ON/OFF, wherein the x-axis represents time and the y-axis represents amplitude in arbitrary units. For the sake of clarity the operation of driving arrangement 300 of FIG. 2A will be described in relation to the graph of FIG. 2B. For ease of understanding, signal PWM is described wherein the active state thereof is the high state and the inactive state is the low state, however this is not meant to be limiting in any way.

The operation of driving arrangement 300 is in all respects similar to the operation of driving arrangement 10 of FIG. 1A, with the exception that first charging current source 130 charges capacitor 320 and second charging current source 140 discharges capacitor 320. Responsive to assertion of signal PWM, current I12 charges capacitor 320 to a value above voltage VOFF, thus asserting signal ON/OFF responsive to the operation of comparator 180, which enables power source 40. ISNS rises responsive to the enabling of power source 40, thus enabling second current source 140 with a value which mirrors signal ISNS. Second current source 140 draws current I14 from the nexus of capacitor 130 and the output of first current source 130 thereby reducing the rate of increasing charge of capacitor 320. When electronically controlled switch 90 opens, responsive to de-assertion of signal PWM, thereby ceasing flow of current I12 as described above, the voltage across capacitor 320 represents the overall charge from the difference between current 12 times the amount of time that signal PWM was asserted, i.e. the difference between the integral of the target current over the target illumination time, and the integral of current I14 over time responsive to the output of power source 40, i.e. the integral of the actual illumination current over the illumination time.

Responsive to signal ISNS, second charging current source 140 begins to discharge capacitor 320. When the voltage across capacitor 320 falls below voltage VOFF, responsive to comparator 180, control circuitry 60 de-asserts signal ON/OFF thus disabling power source 40. As described above, signal ISNS falls over time, thereby capacitor 320 continues to discharge and the voltage across capacitor 320 below voltage VOFF represents a luminance surplus which will be compensated for during the next cycle of signal PWM. Particularly, during the next cycle of signal PWM the luminance surplus causes the voltage across capacitor 320 to begin from a value below voltage VOFF, and thus the assertion of signal ON/OFF will be delayed in relation to the assertion of signal PWM so as to result in a reduced actual illumination. Advantageously, capacitor 320 does not need to be discharged every cycle.

Figure 3:
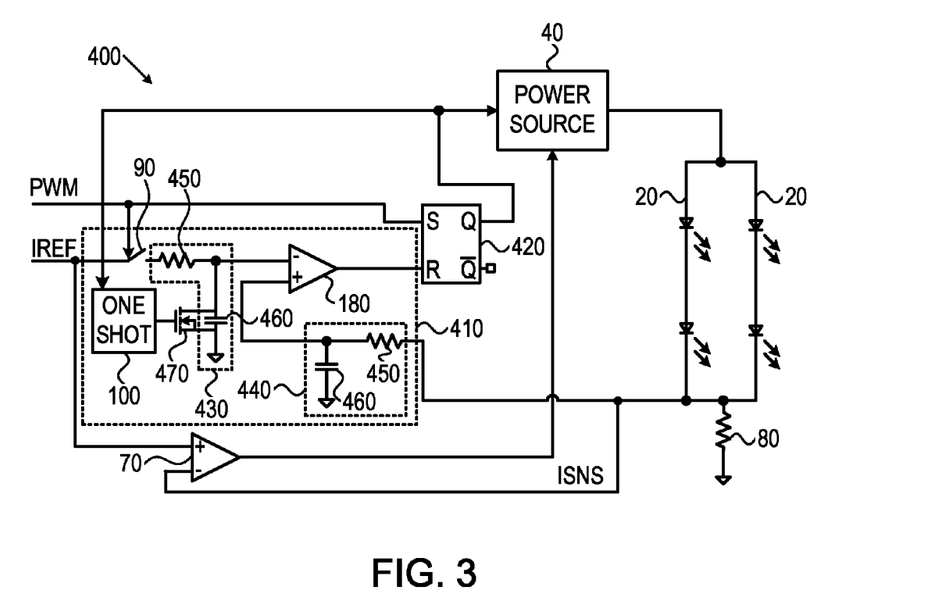
FIG. 3 illustrates a high level schematic diagram of an embodiment of a driving arrangement for a plurality of parallel connected LED strings comprising a comparison circuitry constituted of a pair of low pass filters, wherein the power source is switched alternately on and off responsive to an output signal from the comparison circuitry.

FIG. 3 illustrates a high level schematic diagram of a driving arrangement 400 for a plurality of parallel connected LED strings 20, comprising: a comparison circuitry 410; a power source 40; a control circuitry 420, in one non-limiting embodiment comprising an SR flip-flop; a differential amplifier 70; and a sense resistor 80. Comparison circuitry 410 comprises: an electronically controlled switch 90; a one shot circuitry 100; a target low pass filter 430; an illumination low pass filter 440; a differential amplifier 180, preferably arranged as a comparator; and an electronically controlled switch 470. Each of target low pass filter 430 and illumination low pass filter 440 comprises: a resistor 450; and a capacitor 460. In one non-limiting embodiment, resistors 450 and capacitors 460 are chosen such that the time constant of illumination low pass filter 440 is smaller than the time constant of target low pass filter 450. In one embodiment, electronically controlled switch 470 comprises an NMOSFET. In one embodiment differential amplifier 70 is arranged as a comparator.

A first end of electronically controlled switch 90 is connected to a reference voltage, denoted IREF, and to the non-inverting input of differential amplifier 70. A control input of electronically controlled switch 90 is connected to a pulse width modulated signal, or other time modulated signal, denoted signal PWM. A second end of electronically controlled switch 90 is connected to a first end of resistor 450 of target low pass filter 430 and a second end of resistor 450 of target low pass filter 430 is connected to a first end of capacitor 460 of target low pass filter 430, to the drain of electronically controlled switch 470 and to the inverting input of comparator 180. A second end of capacitor 460 of target low pass filter 430 and the source of electronically controlled switch 470 are connected to a common point. The output of comparator 180 is connected to the reset input of control circuitry 420. The set input of control circuitry 420 is connected to signal PWM and the non-inverted output of control circuitry 420 is connected to a control input of power source 40 and to an input of one shot circuitry 100. The output of one shot circuitry 100 is connected to the gate of electronically controlled switch 470.

The anode ends of plurality of LED strings 20 are commonly connected to an output of power source 40. The cathode ends of plurality of LED strings 20 are commonly connected to a first end of sense resistor 80, to a first end of resistor 450 of illumination low pass filter 440 and to the inverting input of differential amplifier 70. A second end of sense resistor 80 is connected to the common point. A second end of resistor 450 of illumination low pass filter 440 is connected to a first end of capacitor 460 of illumination low pass filter 440 and to the non-inverting input of comparator 180. A second end of capacitor 460 of illumination low pass filter 440 is connected to the common point and the output of differential amplifier 70 is connected to a second input of power source 40. In one embodiment (not shown), the anode ends of plurality of LED strings 20 are commonly connected to a balancing network, as described above in relation to FIGS. 1A and 2A, to ensure equal current flow through each of plurality of LED strings 20.

In operation, responsive to an active state of signal PWM, control circuitry 420 is set thereby enabling power source 40. Current thus begins to flow through plurality of LEDs 20 and capacitor 460 of illumination low pass filter 440 begins to charge responsive to the voltage drop across sense resistor 80, denoted signal ISNS. Additionally, electronically controlled switch 90 is closed and capacitor 460 of target low pass filter 440 begins to charge responsive to reference voltage IREF. As described above in relation to first capacitor 160 of FIG. 1A, the voltage across capacitor 460 of target low pass filter 430 represents an integral of a target current, represented by reference voltage IREF, over a target illumination time, the target illumination time represented by the duty cycle of signal PWM. Specifically, the voltage across capacitor 460 of target low pass filter 430 equals an average of reference voltage IREF over the duty cycle of signal PWM. As described above in relation to second capacitor 170 of FIG. 1A, the voltage across capacitor 460 of illumination low pass filter 440 represents an integral of the actual current flowing through plurality of LED strings 20, as represented by signal ISNS, over the actual illumination time. Specifically, the voltage across capacitor 460 of illumination low pass filter 440 equals the integral of signal ISNS over time.

When signal PWM is de-asserted, electronically controlled switch 90 opens and capacitor 460 of target low pass filter 430 ceases to charge. Capacitor 460 of illumination low pass filter 440 continues to charge, response to signal ISNS, until the voltage across capacitor 460 of illumination low pass filter 440 becomes greater than the voltage across capacitor 460 of target low pass filter 430, thereby causing comparator 180 to reset control circuitry 420, which in turn disables power source 40. Additionally, control circuitry 420 activates one shot circuitry 100 which closes electronically controlled switch 470, thereby discharging capacitor 460 of target low pass filter 430. As signal ISNS drops to below the value of the charge across capacitor 460 of illumination low pass filter 440, capacitor 460 of illumination low pass filter 440 discharges through sense resistor 80 to the common point. As described above, differential amplifier 70 is arranged to control the current output by power source 40 to be at the desired level responsive to reference voltage IREF.

Figure 4A:
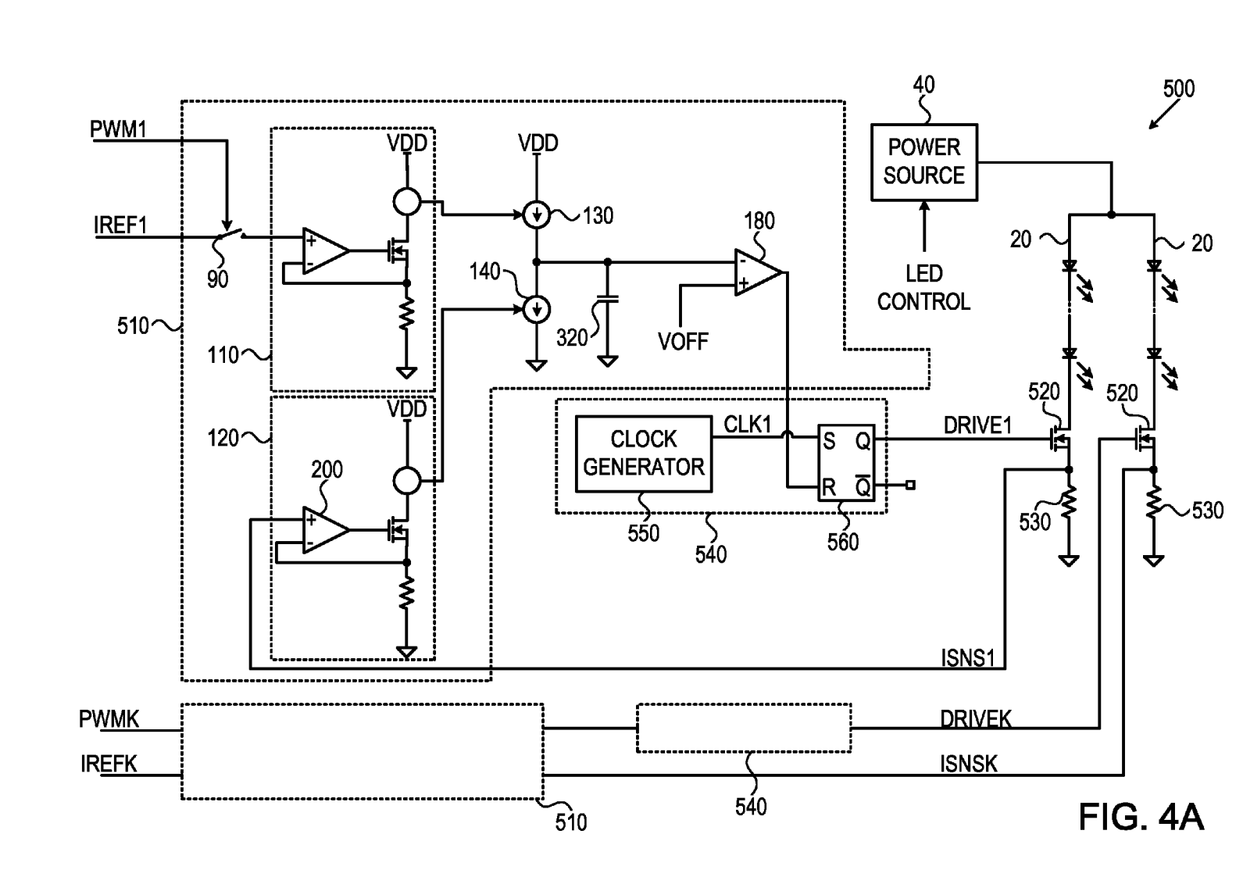
FIG. 4A illustrates a high level schematic diagram of an embodiment of a driving arrangement for a plurality of parallel connected LED strings comprising, for each LED string, a comparison circuitry constituted of a unitary integrating capacitor, wherein an electronically controlled switch in series with the respective LED string is toggled responsive to an output signal from the respective comparison circuitry, each of the comparison circuitries receiving a respective PWM input control signal.

FIG. 4A illustrates a high level schematic diagram of an embodiment of a driving architecture 500 for a plurality of parallel connected LED strings 20 comprising: a power source 40; a plurality of comparison circuitries 510; a plurality of electronically controlled switches 520; a plurality of sense resistors 530; and a plurality of control circuitries 540. Each comparison circuitry 510 is in all respects similar to comparison circuitry 310 of FIG. 2A, with the exception that the first end of capacitor 320, the output of first charging current source 130 and the input of second charging current source 140 are connected to the inverting input of comparator 180 and the non-inverting input of comparator 180 is connected to an offset voltage VOFF. Each control circuitry 540 comprises a clock generator 550 and an SR flip-flop 560. Each of plurality of LED strings 20 has associated therewith a particular comparison circuitry 510, a particular control circuitry 540, a particular electronically controlled switch 520 and a particular sense resistor 530. In one embodiment, each electronically controlled switch 520 comprises an NMOSFET.

A control input of each electronically controlled switch 90 is connected to a respective PWM signal, denoted PWM1 . . . PWMK, and the first end of each electronically controlled switch 90 is connected to a respective reference voltage, denoted IREF1 . . . IREFK. The output of each clock generator 550 is connected to the set input of the respective SR flip flop 560 and is denoted CLK1 . . . CLKK, of which for clarity only CLK1 is shown. The reset input of each SR flip flop 560 is connected to the output of the respective comparator 180. The non-inverted output of each SR flip-flop 560 is connected to the gate of the respective electronically controlled switch 520 and is denoted DRIVE1 . . . DRIVEK. The drain of each electronically controlled switch 520 is connected to the cathode end of the respective associated LED string 20. The source of each electronically controlled switch 520 is connected to a first end of the respective sense resistor 530 and to the non-inverting input of differential amplifier 200 of illumination current circuitry 120 of the respective comparison circuitry 510, and respectively denoted signal ISNS1 . . . ISNSK. A second end of each sense resistor 530 is connected to the common point and the anode ends of plurality of LED strings 20 are commonly connected to an output of power source 40.

Figure 4B:
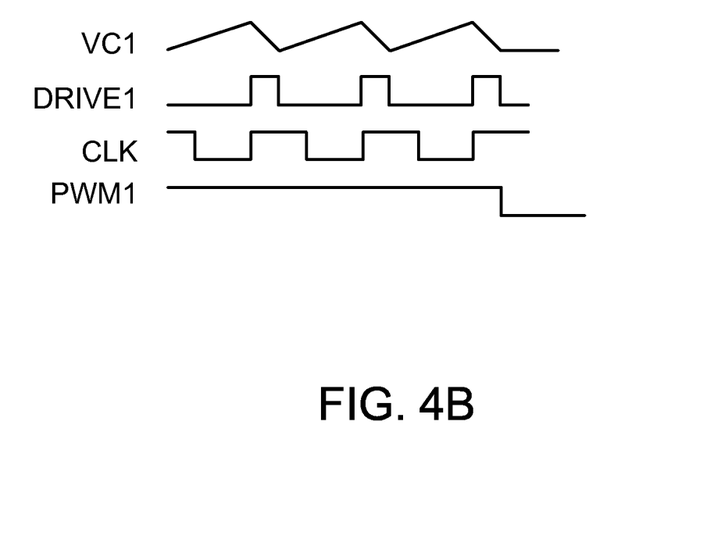
FIG. 4B illustrates a graph of the PWM input control signal, the voltage on the unitary integrating capacitor, a clock signal and the electronically controlled switch toggle signal for a single one of the LED strings of the driving arrangement of FIG. 4A, wherein the x-axis represents time and the y-axis represents amplitude in arbitrary units.

FIG. 4B illustrates a graph of various signals of driving architecture 500 associated with a first of plurality of LED strings 20, specifically: the voltage across capacitor 320, denoted VC1; signal DRIVEL; clock signal CLK1; and signal PWM1, wherein the x-axis represents time and the y-axis represents amplitude in arbitrary units. For the sake of clarity the operation of driving arrangement 500 of FIG. 4A will be described in relation to the graph of FIG. 4B and will further be described in relation to a first of plurality of LED strings 20. For ease of understanding, clock signal CLK1 and signal PWM1 are described wherein the active state is of each signal is the high state and the inactive state is the low state, however this is not meant to be limiting in any way.

In operation, power source 40 provides current to each of plurality of LED strings 20. As described above in relation to FIGS. 2A-2B, capacitor 320 is charged responsive to the high state of signal PWM. During charging of capacitor 320 the voltage there across increases to greater than offset voltage VOFF, and responsive thereto the output of comparator 180 is set to low and SR flip flop 560 is reset. The set input of SR flip flop 560 is controlled by clock generator 550. The frequency of clock signal CLK1 is arranged to be greater than the frequency of signal PWM1, preferably at least 10 times the frequency of signal PWM1. At an active state of clock signal CLK1, SR flip flop 560 is set, thus closing electronically controlled switch 520 via signal DRIVE1 and allowing current to flow through electronically controlled switch 520. As described above, current is drawn by second charging current source 140 responsive to signal ISNS1 representing current flowing through sense resistor 530 and voltage VC1 represents the difference between the overall target luminance of the particular LED string 20, particular the integral of the current flow from first current source 130 representing value IREF over time, and the overall actual luminance of the particular LED string 20, representing the integral of signal ISNS over time. Once voltage VC1 drops below voltage VOFF, i.e. the overall target luminance is achieved, SR flip flop 560 is reset and electronically controlled switch 520 is opened by signal DRIVE1, thereby ceasing current flow there through, and setting ISNS to zero.

Each LED string 20 has a different voltage drop there across, and power source 40 is arranged to supply power with a sufficient voltage for the LED string 20 exhibiting the greatest voltage drop. As a result, a LED string 20 with a lower voltage drop, such as LED string 20 associated with signal DRIVE1, may receive a higher current than represented by the respective target value IREF1, and voltage VC1 will then drop below voltage VOFF before signal PWM1 changes to the de-asserted state and opens electronically controlled switch 90. The increased current is however associated with increased illumination, and thus voltage VC1 represent the total illumination. In particular, in such an event current flow through the LED string 20 associated with PWM1 will cease before signal PWM1 is de-asserted, and the continued assertion of signal PWM1 results in an increase in voltage VC1. At the next high state of clock signal CLK1, particularly responsive to the rising edge of CLK1, electronically controlled switch 520 closes thereby renewing current flow there through until voltage VC1 falls to voltage VOFF responsive to signal ISNS. Thus, each electronically controlled switch 520 is turned on periodically by the respective clock generator 550 enabling current flow until the respective voltage VC1 . . . VCK is equal to voltage VOFF. Any residual difference on capacitor 320 at the end of an active portion of signal PWM is maintained until the next PWM active portion, and compensated for at the beginning of the next PWM active portion.

Advantageously, the various LED strings 20 are thus controlled by the operation of electronically controlled switches 520 in a non-dissipative manner.

Figure 5A:
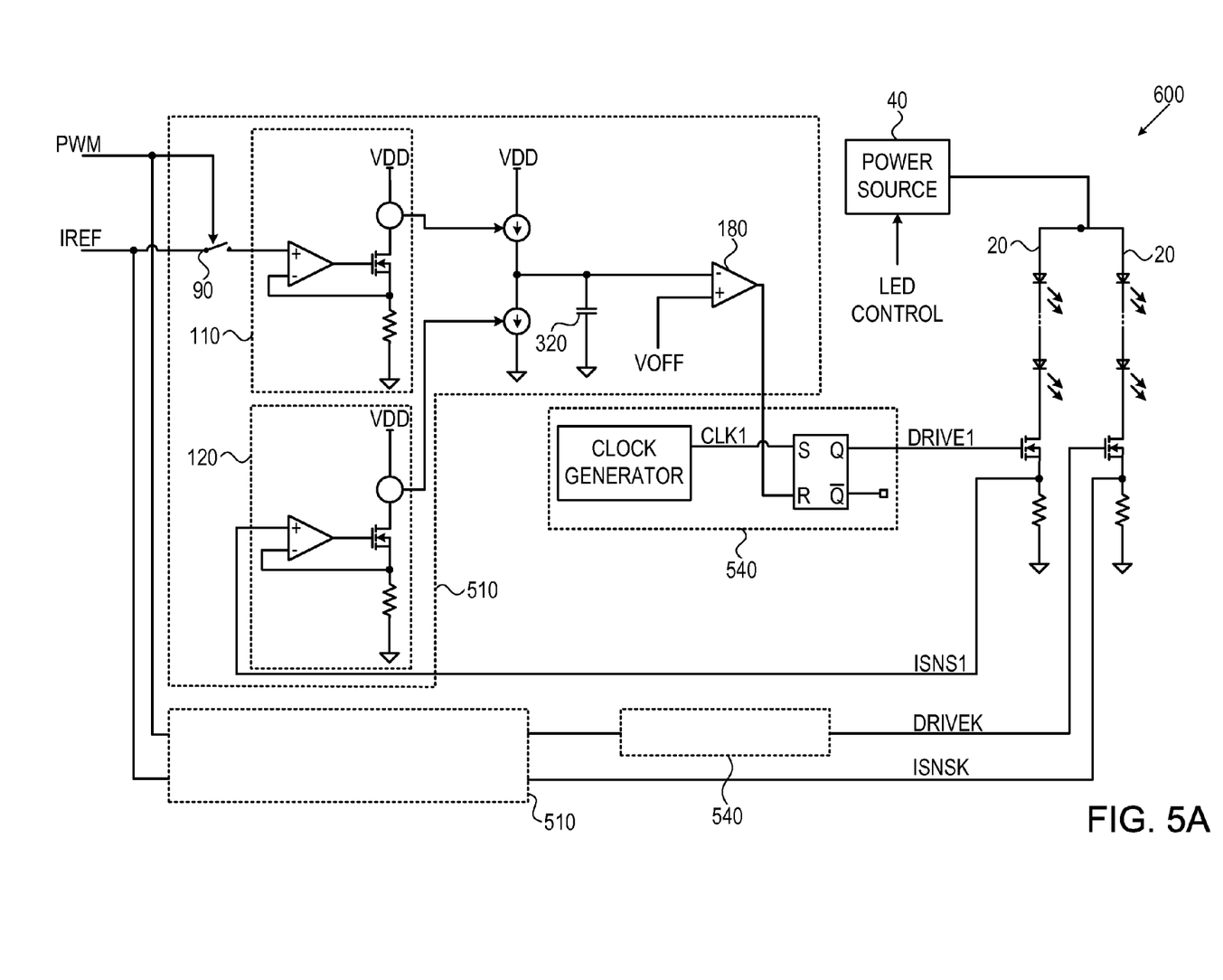
FIG. 5A illustrates a high level schematic diagram of an embodiment of a driving arrangement for a plurality of parallel connected LED strings comprising, for each LED string, a comparison circuitry constituted of a unitary integrating capacitor, wherein an electronically controlled switch in series with the respective LED string is toggled responsive to an output signal from the respective comparison circuitry, the comparison circuitries receiving a common PWM input control signal.
Figure 5B:
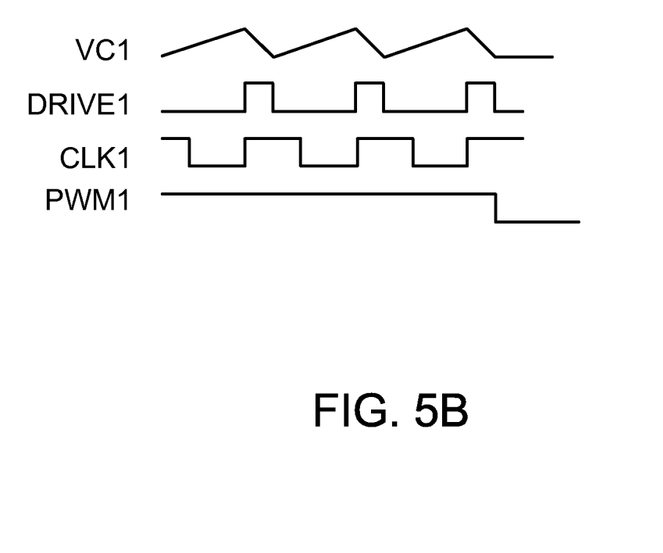
FIG. 5B illustrates a graph of the PWM input control signal, the voltage on the unitary integrating capacitor, a clock signal and the electronically controlled switch toggle signal for a single one of the LED strings of the driving arrangement of FIG. 5A, wherein the x-axis represents time and the y-axis represents amplitude in arbitrary units.

FIG. 5A illustrates a high level schematic diagram of an embodiment of a driving architecture 600 for a plurality of parallel connected LED strings 20. FIG. 5B illustrates a graph of various signals associated with a first one of plurality of LED strings 20 of driving architecture 600, specifically: the voltage across capacitor 320, denoted VC1; signal DRIVE1; clock signal CLK1; and signal PWM, wherein the x-axis represents time and the y-axis represents amplitude in arbitrary units. The arrangement and operation of driving architecture 600, and the description of the signals of driving architecture 600, is in all respects similar to the arrangement and operation of driving architecture 500 of FIG. 4A with the exception that a common PWM signal, denoted PWM, and a common reference voltage, denoted IREF, is provided for the plurality of comparison circuitries 510.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A driving arrangement for light emitting diode (LED) based illumination, the driving arrangement comprising:
   a comparison circuitry arranged to compare an integral of a target current over a target illumination time for a plurality of LED based luminaires with an integral of an illumination current over an illumination time for the plurality of LED based luminaires, said comparison circuitry arranged to output a comparison signal, the plurality of LED based luminaires arranged to receive power in parallel from a common power source; and
   a control circuitry in communication with said comparison circuitry, the common power source responsive to an output of the control circuitry, and wherein the control circuitry is arranged to alternately:
   allow the flow of electrical current through the plurality of LED based luminaires responsive to a first condition of the comparison signal, wherein said allowance comprises activation of the common power source; and
   prevent the flow of electrical current through the plurality of LED based luminaires responsive to a second condition of the comparison signal, the second condition different from the first condition, wherein said prevention comprises deactivation of the common power source.

2. The driving arrangement according to claim 1, further comprising a balancing network, wherein said plurality of LED based luminaires are connected to receive power in parallel from the common power source via said balancing network.

3. The driving arrangement according to claim 1, further comprising a particular electronically controlled switch in series with each of the plurality of LED based luminaires, each of the particular electronically controlled switches responsive to an output of said control circuitry, wherein said allowance of the flow of electrical current through the plurality of LED based luminaires responsive to the first condition of the comparison signal further comprises closure of the particular electronically controlled switch in series with each of the LED based luminaires responsive to the first condition of the output of said control circuitry, and said prevention of the flow of electrical current through the plurality of LED based luminaires responsive to the second condition of the comparison signal further comprises an open condition of the particular electronically controlled switch in series with each of the LED based luminaires responsive to the second condition of the comparison signal.

4. The driving arrangement according to claim 3, wherein said control circuitry comprises a drive signal generator with a periodic output, wherein said allowance of the flow of electrical current through the plurality of LED based luminaires is responsive to the first condition of the comparison signal and to the periodic output.

5. The driving arrangement according to claim 1, wherein said comparison circuitry comprises:
   a first current source arranged to provide a current representative of the target current;
   a first capacitor arranged to be charged by said first current source;
   a second current source arranged to provide a current representative of the illumination current;
   a second capacitor arranged to be charged by said second current source; and
   a comparator arranged to compare the voltage drop across said first capacitor with the voltage drop across said second capacitor, said comparison signal a function of the output of said comparator.

6. The driving arrangement according to claim 1, wherein said comparison circuitry comprises:
   a first current source arranged to provide a current representative of the target current;
   a second source arranged to provide a current representative of the illumination current;
   a capacitor arranged to be charged by a first one of said first current source and said second current source and to be discharged by a second one of said first current source and said second current source; and
   a comparator arranged to compare the voltage drop across said capacitor with a reference voltage, said comparison signal a function of the output of said comparator.

7. The driving arrangement according to claim 1, wherein said comparison circuitry is associated with a particular LED based luminaire of the plurality of LED based luminaires.

8. A method of illumination, the method comprising:
   comparing an integral of a target current over a target illumination time for at least one luminaire of a plurality of luminaires with an integral of an illumination current over an illumination time for the at least one luminaire;
   alternately, allowing the flow of electrical current through the plurality of luminaires responsive to a first condition of the comparison; and
   preventing the flow of electrical current through the the plurality of luminaires responsive to a second condition of the comparison, the second condition different from the first condition,
   wherein said allowing the flow of electrical current comprises activating a common power source, the common power source arranged to provide power in parallel for the plurality of luminaires, and
   said preventing of the flow of electrical current comprises deactivating the common power source.

9. The method according to claim 8, wherein the method further comprises:
   balancing the current flow through each of the plurality of luminaires.

10. The method according to claim 8, wherein said allowing the flow of electrical current through the the plurality of luminaires further comprises closing an electronically controlled switch arranged in series with each of the plurality of luminaires, and said preventing the flow of electrical current through the the plurality of luminaires further comprises opening each of the particular electronically controlled switched in series with the plurality of luminaires.

11. The method according to claim 10, further comprising providing a drive signal generator with a periodic output, wherein said allowing the flow of electrical current through the at least one luminaire is responsive to the first condition of the comparison and to the periodic output.

12. The method according to claim 8, further comprising providing a comparison circuitry arranged to perform said comparing, said comparison circuitry arranged to output a comparison signal, said comparison circuitry comprising:
   a first current source arranged to provide a current representative of the target current;
   a first capacitor arranged to be charged by said first current source;
   a second current source arranged to provide a current representative of the illumination current;
   a second capacitor arranged to be charged by said second current source; and
   a comparator arranged to compare the voltage drop across said first capacitor with the voltage drop across said second capacitor, the comparison signal a function of the output of said comparator.

13. The method according to claim 8, further comprising:
   providing a comparison circuitry arranged to perform said comparing, said comparison circuitry arranged to output a comparison signal, said comparison circuitry comprising:
   a first current source arranged to provide a current representative of the target current;
   a second current source arranged to provide a current representative of the illumination current;
   a capacitor arranged to be charged by a first one of said first current source and said second current source and to be discharged by a second one of said first current source and said second current source; and
   a comparator arranged to compare the voltage drop across said capacitor with a reference voltage, the comparison signal a function of the output of said comparator.

14. A driving arrangement for illumination, the driving arrangement comprising:
   a means for comparing arranged to compare an integral of a target current over a target illumination time for at least one luminaire with an integral of an illumination current over an illumination time for the at least one luminaire, said means for comparing arranged to output a comparison signal;
   a means for allowing the flow of electrical current through the at least one luminaire responsive to a first condition of the comparison signal;
   a means for preventing the flow of electrical current through the at least one luminaire responsive to a second condition of the comparison signal, the second condition different from the first condition; and
   a means for balancing, wherein said at least one luminaire comprises a plurality of luminaires arranged to receive power in parallel from a common means for supplying power via said means for balancing.

15. The driving arrangement according to claim 14, wherein the means for allowing and preventing comprises a control input to the common means for supplying power, wherein said allowance of the flow of electrical current through the at least one luminaire responsive to the first condition of the comparison signal comprises activation of the common means for supplying power responsive to the first condition of the comparison signal, and said prevention of the flow of electrical current through the at least luminaire responsive to the second condition of the comparison signal comprises deactivation of the common means for supplying power responsive to the second condition of the comparison signal.

16. The driving arrangement according to claim 14, wherein the means for allowing and the means for preventing comprises a control input to the common means for supplying power, wherein said allowance of the flow of electrical current through the at least one luminaire responsive to the first condition of the comparison signal comprises activation of the common means for supplying power responsive to the first condition of the comparison signal, and said prevention of the flow of electrical current through the at least luminaire responsive to the second condition of the comparison signal comprises deactivation of the common means for supplying power responsive to the second condition of the comparison signal.

* * * * *